(No Model.) 2 Sheets—Sheet 1.

P. F. C. CHEVRON.
CLOTH MEASURING MACHINE.

No. 498,765. Patented June 6, 1893.

Witnesses
W. Harvey Muzzy
Chas. W. Muzzy

Inventor
Pierre François Cléo Chevron
by Wm H Babcock
Atty (No Model.) 2 Sheets—Sheet 2.
P. F. C. CHEVRON.
CLOTH MEASURING MACHINE.
No. 498,765. Patented June 6, 1893.
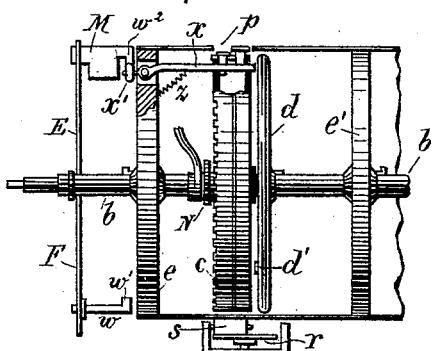
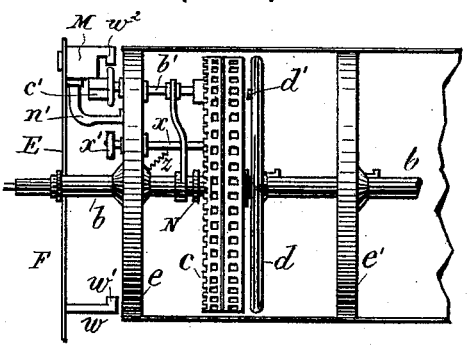
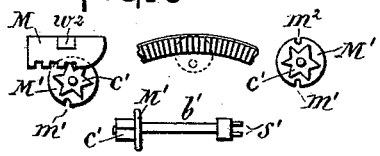
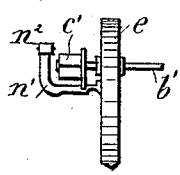
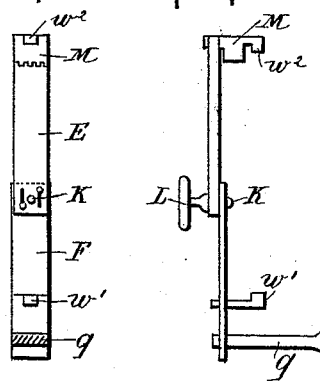
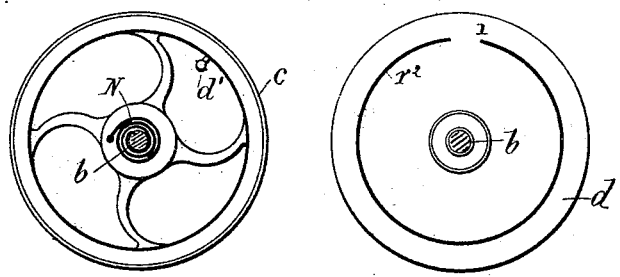
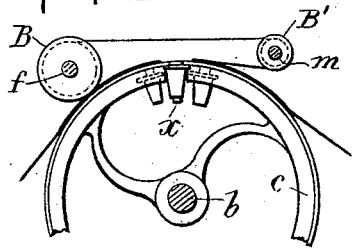

UNITED STATES PATENT OFFICE.

PIERRE FRANÇOIS CLÉO CHEVRON, OF PARIS, FRANCE.

CLOTH-MEASURING MACHINE.

SPECIFICATION forming part of Letters Patent No. 498,765, dated June 6, 1893.

Application filed December 12, 1892. Serial No. 454,961. (No model.) Patented in Belgium April 5, 1890, No. 90,097; in France June 19, 1890, No. 206,359; in England October 4, 1890, No. 15,702, and in Germany October 5, 1890, No. 58,816.

*To all whom it may concern:*

Be it known that I, PIERRE FRANÇOIS CLÉO CHEVRON, a citizen of the French Republic, residing at Paris, France, have invented certain new and useful Improvements in Machines for Measuring Fabrics, (for which Letters Patent have been obtained in Belgium, No. 90,097, dated April 5, 1890; in France, No. 206,359, dated June 19, 1890; in Great Britain, No. 15,702, dated October 4, 1890, and in Germany, No. 58,816, dated October 5, 1890;) and I do hereby declare the following to be a full, clear, and exact description of the invention, such as will enable others skilled in the art to which it appertains to make and use the same.

This invention relates to a machine for measuring fabrics which indicates the measurements on a scale plate and also prints them on the fabric.

The said invention consists in the construction and combination of parts hereinafter particularly set forth and claimed.

Figure 1:
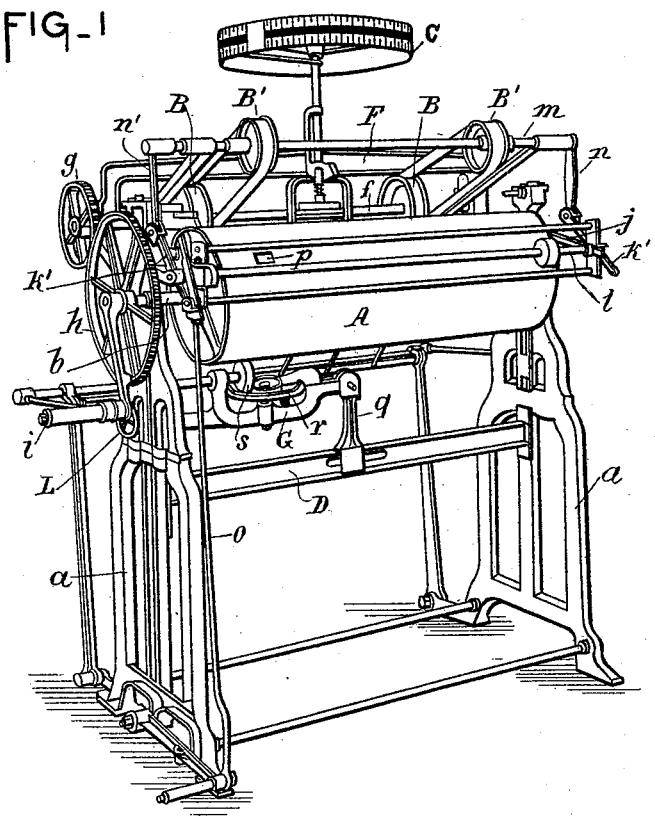
Figure 2:
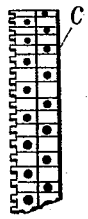
Figure 3:
Figure 4:
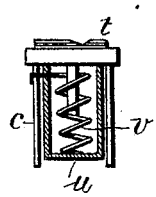
Figure 5:
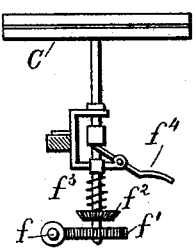

In the accompanying drawings, Figure 1 represents in perspective a machine embodying my invention. Fig. 2 is a detail plan view, enlarged, of a part of the periphery of the numbering wheel. Fig. 3 represents a vertical section through the same on the line $x$—$x$ of Fig. 2. Fig. 4 represents a detail elevation, still further enlarged, of one of the dies, its socket being shown in section. Fig. 5 represents a detail elevation of the annular scale plate and attachments. Fig. 6 represents on an enlarged scale, partly in elevation, partly in section, the devices for operating the fabric-printing numbered dies. Fig. 7 represents a similar view taken nearly at right angles to Fig. 6. Figs. 8, 9, 10, 11, 12, 13 and 14 are detail views.

The main shaft $b$ is mounted in bearings in each side of the frame $a$ of the machine; and carries the numbering wheel $c$ which is capable of turning independently on it, a grooved disk $d$ and the wheels $e$ $e'$, on which the cylinder or drum A is fastened.

B is the upper part of the frame $a$. The cross-bar F' is equally secured at each end, supporting the scale plate C. In this part of the frame is also mounted in fixed bearings the shaft $f$ of the drawing belt pulleys B'.

This shaft is rotated through a toothed wheel $g$, keyed on one of its extremities and engaging a toothed fly wheel $h$, keyed on the main-shaft $b$. This fly-wheel is provided with an eccentric mandrel or wrist-pin $i$ operating all the mechanism.

Two fixed horizontal arms or bars $j$ $j'$ of the upper part of frame $a$, at opposite sides thereof, support levers $k$ $k'$, which are mounted by the sides of the said arms respectively, on a shaft $l$, supported by these arms. These levers have connecting rods $m$ pivoted to their upper ends; and the upper ends of these rods have a shaft $m$ journaled in them. This shaft carries belt-pulleys B', from which belts B² run to the said belt-pulleys B on the relatively fixed shaft $f$.

From the lower end of lever $k$ a long rod $o$ extends downward to a treadle or other device whereby it may be raised or lowered, correspondingly raising or lowering the belt pulleys B' by means of the connecting devices above described, and thus moving the belts B² away from or toward the cylinder or drum A. When the fabric is to be applied to the said cylinder, for measuring, the pulleys B' are lowered until the belts B² are in contact with it and press it tightly on the said cylinder. When the machine is in motion, the parts being thus arranged, the combined action of the drum or cylinder and of the said belts will give the fabric a regular and precise movement forward; which could not be done so perfectly with two cylinders.

The drum A, preferably of sheet iron, is provided with an opening or window $p$ arranged exactly above the numbering wheel $c$. Under this drum or cylinder is a cross-bar D fixed to the frame $a$ at each end and having a short arm $g$ raised rigidly on it. This last arm supports a rotary inking plate $r$ which has a short arbor or stem $r$ free to turn in a bearing $r^2$ of a bar G pivoted at one end on the said arm. This bar G also carries an inking roller $s$ which is journaled therein by its horizontal gudgeon $s'$ and arranged to turn in contact with the said plate directly under the said numbering wheel. The last named part may be turned on the shaft $f$, but is held in stable position thereon by means of a spring hereinafter described. It is provided with an intermediate number of holes arranged in two rows. Each of these holes receives a number die which is composed of a plate $t$ bearing a numerical figure in relief, a tube $u$ entering the said hole and closed at bottom, a spiral spring $v$ extending to the base of the said tube and having one end passed out through the wall of the latter and attached to the wheel so that said spring always serves to hold its number die inward, resisting too great protrusion. This numbering wheel is toothed on one side to receive the part whereby it is turned forward.

By the side of the wheel $c$ on the shaft $b$ is a spiral spring, which bears against it, but allows it to be turned back to zero.

Having now described the principal parts of the machine, I now describe its operation. The numbering wheel presenting through the window $p$ the number 1, the fabric to be measured is placed on the drum A. The shaft $m$ is next lowered, which holds the fabric down by means of the belts $B^2$ on the drum A. The machine being operated the action of the pulleys B B', belts $B^2$ and drum A draws forward the fabric between the said belts and drum. In the interior of the drum all the mechanism will turn with the shaft $b$. Supposing that the drum A has made about a half turn it will cause the following movement in its interior: On the lower part of a plate F of the frame $a$ (Figs. 5, 6, 10 and 11) is a short arm $w$ having a nose $w'$. On the wheel $e$ is a little lever $x$, provided near one end with a stud or lug $x'$, and held by a spring $z$ or otherwise in position for contact. When the stud or lug $x'$ strikes against the nose $w'$, the said lever is forced outward against the resistance of the said spring and pushes out before it one of the numbering dies, as this comes opposite the opening $p$. The said numbering die is thus put into contact with the inking roller $s$. Continuing to turn, the cylinder or drum A will make a complete revolution, that is to say that a meter or a yard of the fabric will be passed on the roll. At this moment the stud or lug $x'$ of the lever $x$ will strike another nose $w^2$ arranged on the upper part of the frame. The said lever acts as before, pushing the now inked numbering die $x$ through the opening $p$ and thus marking the number 1 on the fabric. The fabric being thus marked 1, the numbering wheel $c$ must be kept from displacement so that it will present to the opening $p$ the number 2. For this purpose I have arranged on the upper part of the frame $a$ an arm M of which the lower part is toothed. A small shaft $b'$ passes through the wheel $e$ and rests in a bearing thereof. This shaft is provided with a small wheel $c'$ having six teeth arranged to engage the teeth of arm M. To this wheel is fixed a disk M' provided with peripheral notches $m'$ $m^2$. At the other end the shaft $b'$ is provided with a pin or stud $s'$ which enters between the teeth of the numbering wheel $c$. Below the disk M' on the wheel $c$ is fastened a spring-stop $n'$ (Figs. 7 and 9), which in its normal position engages one of the notches $m'$ and thus locks the wheel $c$. Continuing the rotary movements of the machine the upper part of the spring-stop $n'$, provided with an enlargement $n^2$ will come against the arm M Fig. 7 and will come forth from the notch $m'$, which action will have the effect of unlocking the wheel $c$; the six-toothed wheel $c'$ will engage with the teeth of the arm M and consequently turn half round, a movement repeated by the studs $s'$, which in being thus moved and engaging with the teeth of the wheel $c$, move these to an extent equal to the width of a number die. Thereby the number 1 is moved out of the way and 2 takes its place under the opening $p$. The rotary movement continuing, the toothed wheel $c'$ and the spring stop $n'$ come out of contact with the arm M and the said spring stop proceeds to enter the notch $m^2$ and to lock the wheel $c$ (Fig. 9.) All the movements of inking and measuring are repeated thus until the entire piece of fabric has passed through the cylinder.

The measurement of the piece of fabric is equally visible on the controlling index-wheel or scale-plate C. To this end I have arranged on the arbor $f$ of the pulleys B an endless screw $f^5$ which engages a worm wheel $f'$, with which turns another wheel $f^2$ these two wheels being on the axis or shaft $f^3$ of the said index wheel or scale-plate C. A lever $f^4$ is arranged so that both of these wheels, with the scale plate and their shaft, may be raised so as to free the wheel $f'$ from engagement with the worm $f^5$, for allowing the said scale plate or index wheel to be turned back to zero after the measuring is ended. The numbering wheel $c$ must then be replaced at 1; which may be done by the following means: As shown in Figs. 10 and 11 there are two iron slide plates E F mounted in the frame $a$ on the inner face of the side thereof nearest the fly wheel. The plate E carries on its upper end the arm M having a nose $w^2$ and the arm $g$ of the inking devices hereinbefore described. The plate F carries on its lower end the nose $w'$ also before mentioned. These two plates are arranged in line overlapping at their proximate ends where they are perforated with slots K', which receive respectively the two studs $K^2$ of a turning pin K, which is controlled by a little hand wheel L (Figs. 1 and 11) formed on it. By turning this wheel one of the studs of the said pivot will be caused to move the slide-plate E upward and the other will be caused to move the slide plate F downward; or reversely, according to the direction of rotation. In the former case, the motion stated will have the effect of preventing the parts $c'$ $x'$ and $n'$ from operating as hereinbefore described, as well as to cause the inking roller to descend. By means of these devices the fabric may be left unmarked when desired, while the measuring action of the machine continues.

To reset the numbering wheel $c$ at 1, the shaft $b'$ is moved to the left and held there by a suitable spring stop, whereby the teeth of wheel $c$ are freed from pins $s'$. At this moment, the spring N, Fig. 12, which is fastened to the shaft $b$ and the side of the wheel $c$ and which has been wound up by following the forward rotation of the said wheel, unwinds itself and turns back the said wheel as far as it has turned forward.

On the shaft $b$ in proximity to the numbering wheel $c$ is a disk $d$, fast with said shaft. This disk is provided with a curved groove $r^2$ in which moves a small stud or lug $d'$ (Figs. 6, 7 and 12) on the side of the numbering wheel $c$. This stud, while the said wheel turns forward, follows the said groove beginning at one end thereof, and when the wheel $c$ is turned backward by the spring N, the said stud travels back in the said groove to its first point or place, corresponding to the position of the numeral 1 on the numbering wheel. Of course the proportions of all the wheels are calculated to suit their work. As the measured fabric falls over on the delivery side of the machine it may be received and removed by suitable reciprocating or rotary mechanism; which need not be described here as it is not illustrated in the drawings nor claimed as a part of this invention.

Having thus described my invention, what I claim as new, and desire to secure by Letters Patent, is—

1. In combination with a cloth-measuring drum and actuating and indicating mechanism, a pair of shafts and pulleys, belts connecting the said pulleys, and devices for raising and lowering said belts to cause them to engage or disengage said drum for holding the cloth thereon or not and assisting in feeding or stopping it substantially as set forth.

2. In combination with an inking plate and roller, movably mounted on the frame and under the measuring drum means for automatically raising them into position for inking the number dies, in combination with a numbering wheel having such dies in its periphery and a rotary measuring drum inclosing the said wheel and having an opening in its periphery for the protrusion of the said dies one by one, to be inked and to mark the fabric substantially as set forth.

3. In combination with a measuring drum having an opening in its periphery, a numbering wheel arranged within the said drum and having a series of dies protruding from its periphery so as to come successively under the said opening, means for forcing the said dies through the latter, and actuating mechanism for turning the said drum continuously and the said numbering wheel with a step by step motion substantially as set forth.

4. In combination with the numbering wheel $c$ mounted on the main shaft and means for turning it forward, the arm M, attached to the frame shaft $b'$ journaled in wheel $c$, wheel $c'$, disk M', studs $s'$ mounted on shaft $b'$ and spring $n'$ engaging wheel M' constructed arranged and operating substantially as set forth.

5. The sliding plates E F, having lugs $w'$ and $w^2$ and mounted on frame $a$ in combination with the turning pin K having two studs which enter slots in their proximate ends for forcing them apart or drawing them together, inking devices mounted below a measuring drum and type-actuating mechanism in said drum and arranged for contact with the said lugs when in position to be struck, a numbering wheel carrying the said type and mounted on the main shaft, a measuring drum inclosing the said numbering wheel and provided with an opening for the protrusion of the said type successively and actuating mechanism for the said drum and numbering wheel substantially as set forth.

6. In combination with a numbering wheel having a series of number dies on its periphery and a stud $d'$ on its side, mechanism for rotating the same, step by step, and devices for returning the said wheel to its first position consisting of the spring N, the grooved disk $d$, and the shaft on which the said wheel and disk are mounted, the groove of said disk receiving the said stud substantially as and for the purpose set forth.

In testimony whereof I affix my signature in presence of two witnesses.

PIERRE FRANÇOIS CLÉO CHEVRON.

Witnesses:
   ROBT. M. HOOPER,
   E. GLONE.